Nov. 26, 1940.  E. H. LANGE  2,223,149

AUTOMOBILE CONTROL MECHANISM

Filed Nov. 13, 1931  2 Sheets-Sheet 1

WITNESSES:
H. A. Letmate
B. A. Greene

INVENTOR.
Edward H. Lange.

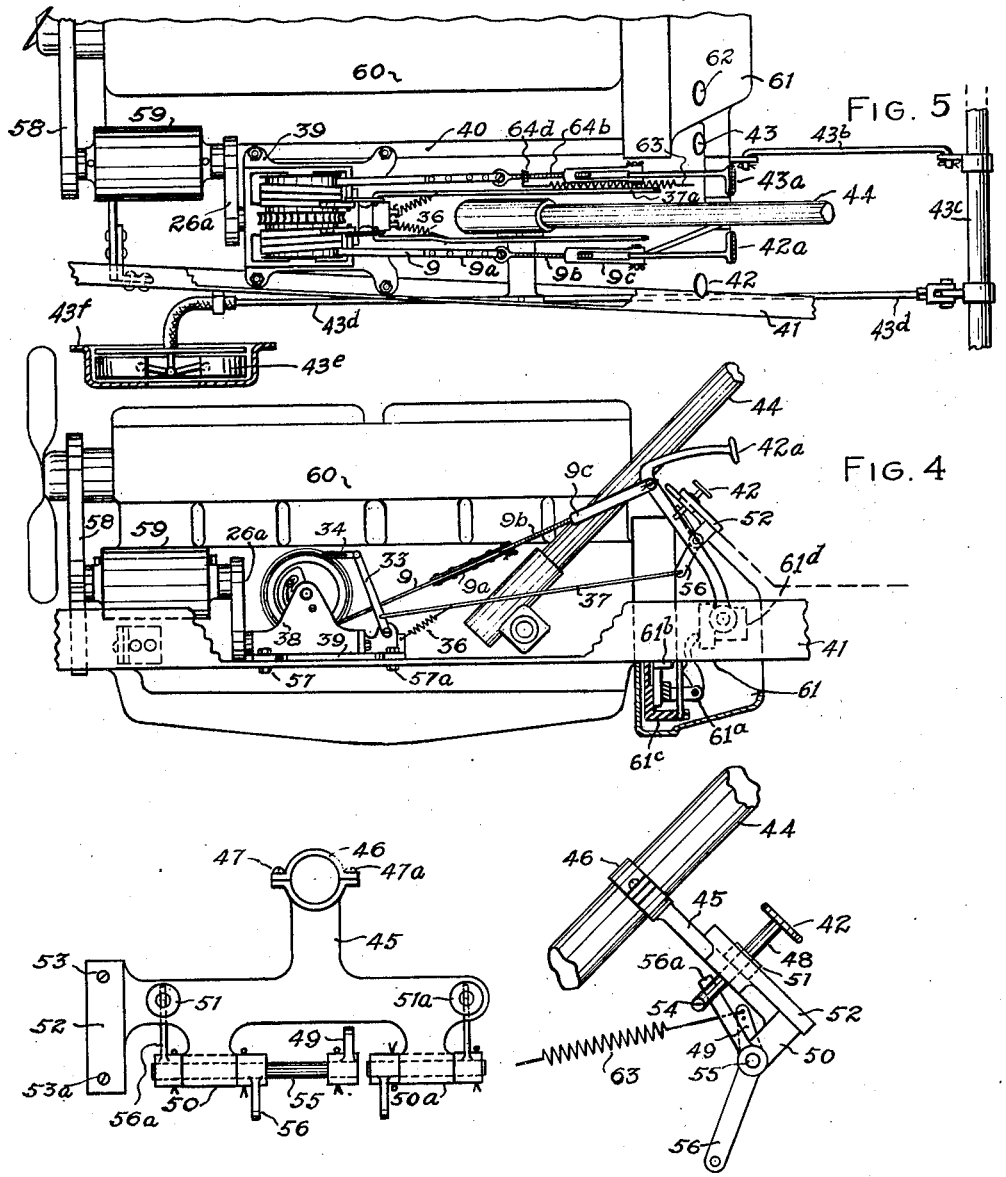

Patented Nov. 26, 1940

2,223,149

UNITED STATES PATENT OFFICE 2,223,149

AUTOMOBILE CONTROL MECHANISM

Edward H. Lange, Baltimore, Md.

Application November 13, 1931, Serial No. 574,894

31 Claims. (Cl. 192—13)

This invention relates to a mechanism by means of which the clutch of an automobile can be selectively controlled by the application of a small force and motion upon a floor-button, and by means of which the brakes of the automobile can be jointly controlled with the clutch by the application of a small force and motion upon another floor-button.

The principal object of this invention is to provide an automobile controlling device which is simple in structure and readily adaptable to present types of automobile without considerable and costly changes in automobile design, by means of which the tiresome posture necessary in the operation of the clutch or brakes by direct force is eliminated, and by means of which the effort required of the operator in controlling the brakes and the clutch is greatly reduced.

A further object of this invention is to provide a mechanism by means of which the clutch and the brakes can be operated by power from the engine, and smooth control of the automobile obtained, by a floor-button located in close proximity to the clutch pedal, and by a floor-button located in close proximity to the brake pedal and accelerator.

An important feature of this invention is the simple compensating means for providing smooth engagement of the clutch by concurrently restraining the engagement of the clutch in proportion to the magnitude of the forward acceleration of the automobile, and during the entire period of forward acceleration. By this means the restraining force is concurrently proportional to the acceleration, and is responsive at each instant during the period of acceleration to changes in magnitude of the acceleration. The principle of compensation of this invention is distinguished by these important differences from the principle of compensation by sequence operations. In sequence operations, an initial period of acceleration must elapse before any corrective forces are called into play upon the clutch, and further, the corrective forces thus initiated are unrelated in magnitude to the acceleration by any simple proportionality, and require a further time interval for correcting an initially excessive acceleration, after the event.

With the above objects in view the invention consists in the matters hereinafter set forth and more particularly pointed out in the appended claims, reference being had to the accompanying drawings.

Figure 1:
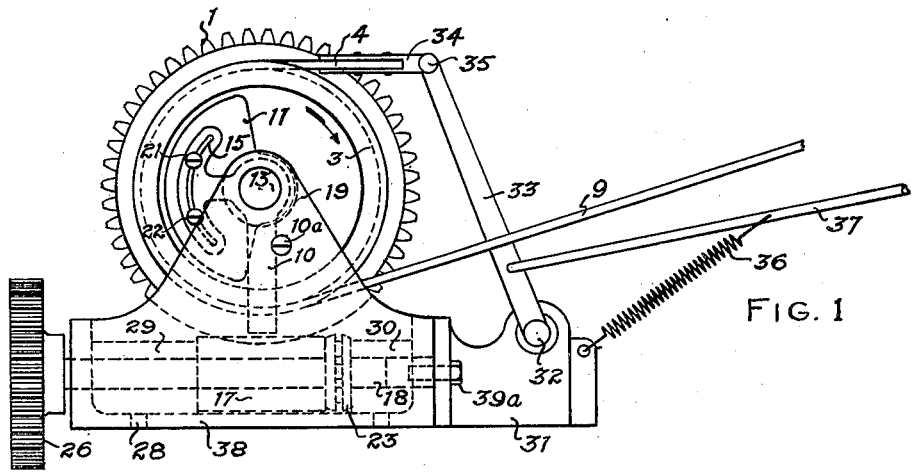
Figures 2, 3:
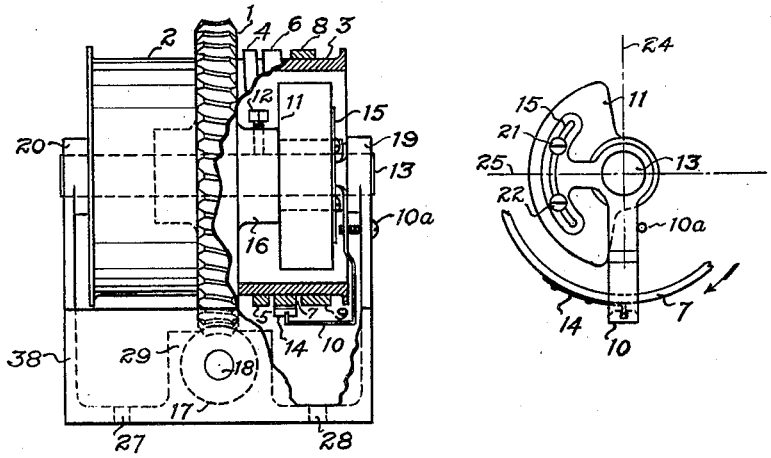

In the drawings, sheet 1, Fig. 1 shows a side view of the control unit for the clutch and the brakes, Fig. 2 shows an end view of the control unit, with a partial vertical section of the drum, showing the compensator within the drum, and Fig. 3 shows a detail side view of the compensator.
In the drawings sheet 2, Fig. 4 shows a side view of the engine and method of driving and mounting the control unit, Fig. 5 shows a plan view of the engine and chassis, and of the control unit mounted between the engine base and chassis, Fig. 6 shows a side view of the floorplate and floor-button linkage, and Fig. 7 shows a plan view of the floor-plate and control levers.

Referring to Fig. 1, at 1 is shown the gear wheel which is rotated by the worm wheel 17, the worm wheel being fixed to the shaft 18 which turns in the bearings 29 and 30, and which is driven by the gear wheel 26. At 23 is shown a roller thrust bearing, and at 28 is a hole in the frame 38, for the purpose of mounting the frame to a base-plate. The shaft 13 supports the drums 2 and 3, only 3 being shown in Fig. 1, and the shaft 13 is free to turn in the bearings 19 and 20 of the frame 38, only bearing 19 being evident in Fig. 1. Within the drums 2 and 3 are compensators, hereinafter more fully described, each having an unbalanced mass of metal free to turn about the shaft 13, as shown for example at 11. Fixed to each of the unbalanced masses is an arm such as that shown at 10, the arm being adjustably fixed by means of the screws 21 and 22 through the slot 15. Each of the arms is limited in its travel by a screw through the frame, such as that shown at 10a. The flexible belt 9 is tapered in width, and coiled around the drum 3, the wide end at 9 being the high tension end, and the narrow end at 4 being the low tension end. Fastened to the frame 38 is the end member 31, which supports the lever 33 by means of the pivot 32. The attachment 34 is fixed to the low tension end of the belt 4, and pinned to the lever 33 at 35. The pull rod 37 is attached to the lever 33 in such a manner that the displacement to the right of 37 causes a proportionally greater displacement to the right of the low tension end 4 of the belt. The spring 36 attached to the rod 37 and the end member 31, constrains the lever 33 to return to its normal position upon release of the force applied to the pull rod 37. The end member 31 is fastened to the frame 38 by the screw 39a.

Referring to Fig. 2, the drums 2 and 3 are an integral part of the gear wheel 1, and rotate along with the gear wheel, the gear wheel and drums being fixed to the shaft 13 by the hub 16 and set-screw 12. For purposes of illustration a portion of the right hand drum and frame are shown as removed, in order that the compensator and attachment of the compensator arm to a portion of the belt upon the drum may be more evident. The belt convolutions are shown at 4, 5, 6, 7, 8, and 9, the belt increasing in width from 4 to 9. At 14 is shown a radial projection which is fixed to the belt at 7, the radial projection being free to slide radially in a radial slot in the arm 10. At 10a is shown the screw which forms a stop to limit the rotation of the arm 10, and at 27 and 28 are holes for the purpose of fastening the frame to a base-plate. For simplicity of illustration, the corresponding belt and compensator of the drum 2 are omitted.

Referring to Fig. 3, one of the compensators is shown in further detail. The fixed direction of rotation of the drum is shown by the arrow. In its normal position, that is when the rod 37 of Fig. 1 is not being displaced to the right, the unbalanced mass 11 tends to rotate in a direction opposite to that of the drum. The positive engagement of the arm 10 with the portion of the belt at 7, causes the convolution 7, 8, 9 to unwind from the drum, and the remaining convolution 4, 5, 6, of the belt to wind upon the drum. By means of the stop 10a, both the unwinding of the portion 7, 8, 9, and the winding of the portion 4, 5, 6, are limited, and the radial projection 14 is constrained to return to a fixed position. The slack of the belt under normal conditions, that is when no pull is being exerted upon the end 4 of the belt, tends to be a minimum at the high tension end of the belt at 9, and a maximum at the low tension end 4 of the belt. This cumulative uncoiling of the belt at the low tension end 4, gives rise to a lost motion of the end 4 which must be taken up before effective coupling of the belt takes place with the drum when the low tension end of the belt is pulled to the right. As a certain minimum of slack is necessary, and as this slack increases with the gradual wear of the belt, it is important to evenly distribute the slack so as to reduce the lost motion at the end 4 to a minimum. At the same time, since the low tension end of the belt is most sensitive for energizing the clutch or the brakes by coupling the belt with the drum, it is necessary to prevent excessive tightening of the low tension end of the belt in distributing the slack toward the high tension end of the belt, so that the device does not become self energizing. This is accomplished by the stop 10a, which returns the portion of the belt to which the arm is attached to a fixed position. As the necessary travel of the belt is large, in order to fully deflect the operating lever to which the high tension end of the belt is connected, the arm 10 is constrained to turn through a correspondingly large angular displacement. Thus, in the normal condition the centre of gravity of the unbalanced mass may lie upon the axis 25, and in the deflected condition the centre of gravity may lie to the right of the vertical axis 24, upon the axis 25. In this position, the unbalanced mass tends to rotate in the same direction as the drum, and to retard the release of the belt when the force at 4 is released. The proportioning between the displacements over which unwinding takes place with reference to the displacements of the belt over which winding takes place, can be adjusted by means of the screws 21, 22, and the slot 15. The unbalanced mass of the compensator device is subject to the forces of acceleration in addition to the normal gravity force, and the forward acceleration caused by engagement of the clutch causes the unbalanced mass to have a clockwise or restraining force at 14, Fig. 3, and the resultant force at 9 is greatly increased by the force increase obtained by the coupling from 7 to 9. As the clutch engages, the centre of gravity of the compensator is above the horizontal axis 25, and is thrown to the right by forward acceleration, the greater the acceleration the greater is the restraining force tending to prevent further engagement of the clutch. The unbalanced mass tends to continue forward when braking takes place, and thus to produce a counter-clockwise moment about 13, causing the compensator associated with the brake operating mechanism to oppose sudden gripping of the brakes.

Referring to Fig. 4, at 41 is shown the chassis channel beam, at 60 the engine, at 58 the fan drive, at 59 the generator, and at 26a the drive for the gear wheel 26 of the control unit. The frame 38 is fastened to the base-plate 39, which is fastened to the chassis by the bolts 57 and 57a. The high tension end 9 of the belt is riveted to the terminal member 9a, and the screw-rod 9b is pinned at one end to the terminal member 9a and at the other end screwed into the pedal attachment 9c. At 44 is shown the steering-post, and at 52 a part of the floor-plate. At 42 is a floor-button for operation of the clutch pedal 42a. Within the clutch housing 61 is shown a conventional form of clutch. The flywheel 61c is normally engaged with the driven disc 61b, and the clutch-plate 61a normally holds the disc and flywheel in frictional engagement by means of springs not shown, and in a manner well understood. By means of the clutch-collar 61d, deflection of the pedal 42a to the left causes the clutch-plate to be displaced to the right, and to release the frictional engagement of the flywheel and disc.

Referring to Fig. 5, at 39 is shown the base-plate, between the engine base 40 and chassis channel beam 41. The clutch operating floor-button 42 is located in close proximity to the clutch pedal 42a, and the brake operating floor-button 43 is located in close proximity to the brake pedal 43a and the accelerator floor-button 62. By means of the nut 64d upon the screw-rod 64b, the spring 63 is adjustably fastened; the spring being connected to a part of the clutch control linkage, as subsequently described. At 61 is the housing for the clutch. Connected with the brake pedal 43a is shown a conventional form of brake mechanism. The link 43b connects the pedal 43a and the cross-shaft 43c, also the cross-shaft connects with the brake-band 43e within the drum 43f by means of the rod 43d.

Referring to Fig. 6, and to Fig. 7, the floor-plate for supporting the floor-button linkages is shown at 45. It is supported by means of the clamp 46 about the steering-post, the screws 47 and 47a, and the ledge 52, which is fastened to the floor-board support by the screws 53 and 53a. At 42 is the clutch operating floor-button, fastened to the rod 48, which engages the crank lever 56a. The rod 48 is slotted at its lower end to accommodate the crank lever 56a, and the screw 54 prevents the rod from leaving the crank lever. The crank lever 56a is fastened to the shaft 55, which is supported by 50. Fastened to the shaft 55, are also the crank levers 56 and 49. The spring 63 is fastened to the arm 49. At 51 and 51a are guides for the clutch operating rod and brake operating rod, respectively. At 50a is a support for the brake operating crank levers; these levers being similar to 56 and 56a.

Having thus described the structure of this invention, the operation of the device will be more clearly evident from the following description.

In order to operate the clutch alone, it is only necessary for the operator to rotate his foot about the heel, and elevate the foot sufficiently to accommodate the clutch operating floor-button. The exertion of a small force upon the floor-button deflects the crank lever 56 to the right, pulls the rod 37 to the right, and couples the flexible belt 9 with the drum 3. A proportionally larger force is exerted upon the clutch pedal 42a, causing it to deflect. The clutch pedal can be used directly if desired, however, owing to the fact that both the clutch pedal and the brake pedal are retained only for emergency purposes, it is desirable to considerably reduce the size of the treads of these pedals, as shown at 42a and 43a, in order to provide a maximum amount of space for a comfortable and relaxed position of each foot, without interference from the pedals. This feature, together with the preferred location of the clutch operating floor-button, and the selective operation of the clutch by means of the clutch pedal, has been previously disclosed in U. S. Patent 1,778,220, Automobile clutch-control system, patented October 14, 1930.

When a small force is exerted upon the floor-button 43, by similar mechanism the pull-rod 37a is displaced to the right, and the brake pedal deflected. As the brake pedal is pulled out, the spring 63 which is attached to the arm 49, is pulled to the left. Thus, the mechanism for disengaging the clutch is energized. The spring 63 is adjusted so that the minimum deflection of the brake pedal for complete application of the brakes when the brakes are tightly adjusted, is sufficient to deflect the arm 49 the necessary amount to disengage the clutch. As the brakes wear, and the brake pedal deflects a greater amount for complete application of the brakes, this adjustment insures disengagement of the clutch upon complete application of the brakes.

Both the clutch operating floor-button and the brake operating floor-button are located upon the inclined portion of the floor of the car, sufficiently above the level portion of the floor to permit the operator's foot to rest upon the inclined portion, in a comfortable position. The clutch operating floor-button is located to the left of and near to the clutch pedal, and the brake-operating floor-button is located to the right of and near to the brake pedal, also in close proximity to the engine accelerator floor-button 62. By means of this arrangement, a maximum of operating comfort is attained with this invention. When both the brakes and the clutch are operated, as for example in bringing the automobile to rest, a small force and displacement impressed upon the button 43 is sufficient to accomplish the result; the close proximity of the buttons 43 and 62 then enables the operator to gradually release the brakes and engage the clutch, and to operate the accelerator button with a minimum of change in position of the right foot.

Obviously, changes may be made in the construction and arrangement of parts, without departing from the spirit of my invention, and I do not therefore limit myself to the form or arrangement shown.

What is claimed is:

1. In an automobile, the combination of a mechanism operable by power from the engine for operating the clutch control member, a mechanism operable by power from the engine for operating the brake control member, a first sensitive control mechanism for applying or releasing the power from the engine to actuate said mechanism for operating the brake control member, a second sensitive control mechanism for applying or releasing the power from the engine to actuate said mechanism for operating the clutch control member, and an interconnecting mechanism adjustably interconnecting the brake control member and the second sensitive control mechanism, whereby the clutch is separately and selectively operable from one of said sensitive control mechanisms, and the clutch and brake jointly operable in predetermined relation to each other from the other of said sensitive control mechanisms.

2. In an automobile, an engine-power operated mechanism for engaging or disengaging the clutch, an engine-power operated mechanism for applying and releasing the brakes, and an adjustable displacement inter-relating mechanism, whereby the clutch can be separately engaged or disengaged, and whereby the clutch and the brakes are constrained to operate in displacement related conjunction, to insure the clutch being disengaged when the brakes are completely applied, and the clutch being engaged when the brakes are completely released.

3. An automobile control mechanism comprising a drum rotated by the engine in a fixed direction at greatly reduced speed relative to the engine speed, a frame, a base-plate, a flexible frictional belt coiled around the drum, having one end connected adjustably to the clutch lever and the other end to a floor-button linkage, a second flexible frictional belt coiled around the drum, having one end connected adjustably to the brake lever and the other end to a second floor-button linkage, and an interconnecting linkage between the brake lever and the first floor-button linkage, said drum being contained within the frame, and the frame being secured to the base-plate which is fastened to the engine base and chassis, whereby the application of a small force and motion to the first floor-button linkage causes the clutch lever to be deflected, and whereby the application of a small force and motion to the second floor-button linkage causes both the clutch lever and the brake lever to be deflected.

4. An automobile control mechanism comprising a drum rotated in a fixed direction at greatly reduced speed relative to the engine speed, a first floor-button linkage returned to normal position by means of a spring, a second floor-button linkage returned to normal position by means of a spring, a first flexible belt coiled around the drum having one end connected adjustably to the brake pedal and the other end to a part of the first floor-button linkage, a second flexible belt coiled around the drum having one end connected adjustably to the clutch pedal and the other end to a part of the second floor-button linkage, an adjustable compensator within the drum connected with the first flexible belt, and an adjustable compensator within the drum connected with the second flexible belt, said adjustable compensators providing a positive and limited uncoiling of the respective belts in the normal position, and a retardation of the respective belts upon release from their deflected positions.

5. An automobile clutch-control mechanism comprising a drum rotated in a fixed direction about a horizontal drum-shaft at greatly reduced speed relative to the engine speed, a frame containing the drum mounted between the engine base and chassis, a floor-button connected to a motion increasing linkage which is returned to its normal position by means of a spring, a flexible belt coiled around the drum having one of its ends connected to the clutch pedal and the other of its ends connected to the large motion part of said motion increasing linkage, and a compensator, said compensator comprising an unbalanced mass within the drum, free to turn about the drum-shaft, an arm adjustably fixed to the unbalanced mass having a radial slot which engages a radial projection fixed to a portion of the flexible belt, and a stop which limits the rotation of the arm, said rotation being normally the opposite of that of the drum, whereby a small force exerted upon the floor-button insufficient for direct operation of the clutch pedal, deflects the clutch pedal, causing the unbalanced mass to rotate across the vertical axis of the drum, and whereby release of said small force causes the unbalanced mass to retard the return of the clutch pedal over a portion of its travel, and causes the compensator to provide a positive and limited uncoiling of a portion of the flexible belt during the remainder of the travel of the clutch pedal.

6. In combination, a clutch-control mechanism and a brake-control mechanism, each of said mechanisms comprising the operating mechanism of claim 5 separately, the flexible belt of the brake-control mechanism being connected to the brake pedal, and an interconnecting mechanism, whereby the clutch is separately and selectively operable, and whereby the clutch and the brakes are constrained to be jointly operable.

7. In combination, a clutch-control mechanism, a brake control mechanism, and a mechanism connecting said mechanisms; said clutch-control mechanism comprising a drum rotated in a fixed direction about a horizontal drum-shaft at greatly reduced speed relative to the engine speed, a frame containing the drum mounted between the engine base and chassis, a floor-button connected to a motion increasing linkage which is returned to its normal position by means of a spring, a flexible belt coiled around the drum having one of its ends connected to the clutch pedal and the other of its ends connected to the large motion part of said motion increasing linkage, and a compensator, the compensator comprising an unbalanced mass within the drum, free to turn about the drum-shaft, an arm adjustably fixed to the unbalanced mass having a radial slot which engages a radial projection fixed to a portion of the belt, and a stop which limits the rotation of the unbalanced mass; said brake-control mechanism being separate and identical with the clutch-control mechanism except that the flexible belt is connected with the brake pedal and coiled around a common drum, said combination providing a sensitive control mechanism whereby the clutch can be selectively operated, and the clutch and the brakes jointly operated.

8. In combination, a sensitive control device for operating the clutch in an automobile, a sensitive control device for operating the brakes in said automobile, and a mechanism connecting said devices containing a yielding linkage, whereby the brakes and clutch are jointly operable from a single control.

9. The combination in an automobile of a mechanism for operating the clutch, a mechanism for operating the brakes, and a yielding connection between said mechanisms, whereby the clutch is selectively operable from a first control position, and whereby the clutch and the brakes are jointly operable from a second control position, said yielding connection providing positive release of the clutch upon full application of the brakes, independent of the increasing wear of the brakes.

10. The combination in an automobile of a mechanism having means for operating the clutch control member by power from the engine, a mechanism having means for operating the brake control member by power from the engine, a floor-button mechanism for controlling the means for operating the clutch control member, a second floor-button mechanism for controlling the means for operating the brake control member, and an adjustable linkage between the brake control member and the first floor-button mechanism, whereby the clutch is selectively operable from the first floor-button mechanism, and whereby the clutch and the brake are jointly operable in displacement relation to each other from the second floor-button mechanism.

11. An automobile clutch-control mechanism comprising a drum rotated in a fixed direction about a horizontal drum-shaft at greatly reduced speed relative to the engine speed, a frame containing the drum mounted between the engine base and chassis, a floor-button connected to a motion increasing linkage which is returned to its normal position by means of a spring, a belt wound around the drum having one of its ends connected to the clutch pedal and the other of its ends connected to the large motion part of the motion increasing linkage, and a compensator, said compensator comprising an unbalanced mass within the drum free to turn about the drum-shaft, an arm adjustably fixed to the unbalanced mass having radial slot means for engaging a radial projection which is fixed to the belt upon the drum surface, and a stop which limits the rotation of the arm, said arm tending normally to rotate in a direction opposite to that of the drum and to unwind a portion of the belt, said stop limiting the unwinding and preventing excessive winding of the remaining portion of the belt, said radial slot means permitting a radial displacement of the belt away from the drum, and said unbalanced mass being constrained to turn across the vertical axis of the drum when the floor-button is fully depressed, and to retard the release of the belt upon release of the floor-button.

12. The combination of a clutch-control mechanism, a brake-control mechanism, and a connecting mechanism, said clutch-control mechanism consisting of the mechanism of claim 11, said brake-control mechanism being identical with the clutch-control mechanism except that the belt is wound around a common drum and connected at one of its ends to the brake pedal, said connecting mechanism consisting of a spring connection between the belt which is connected to the brake pedal and the motion increasing linkage of the clutch-control mechanism.

13. In a clutch-control mechanism having a drum, a horizontal drum-shaft, a belt wound around the drum having one of its ends connected to the clutch pedal and the other of its ends connected to a motion increasing linkage which is returned to its normal position by means of a spring, and a floor-button connected with the small motion part of said motion increasing linkage, a compensator comprising an unbalanced mass within the drum free to turn about the horizontal drum-shaft, an arm adjustably fixed to the unbalanced mass having radial slot means for engaging a radial projection which is fixed to the belt upon the drum surface, and a stop which limits the rotation of the arm, said arm tending normally to rotate in a direction opposite to that of the drum and to unwind a portion of the belt, said stop limiting the unwinding and preventing the excessive winding of the remaining portion of the belt, said radial slot means permitting a radial displacement of the belt away from the drum, and said unbalanced mass being free to turn through a large angle and constrained to turn across the vertical axis of the drum when the floor-button is fully depressed, said compensator providing means for retarding the release of the belt upon release of the floor-button from the fully depressed position, and means for evenly distributing the slack of the belt when the floor-button is in the normal undepressed position.

14. In a clutch-control mechanism having a drum, a horizontal drum-shaft, a belt wound around the drum with one of its ends attached to the clutch pedal and the other of its ends attached to a controlling linkage, and means for rotating said drum, a compensator, said compensator having means for constraining a part of the belt at the drum surface to return to a fixed position independent of the wear of the belt, and means for retarding the release of the belt when said controlling linkage is released from its deflected position.

15. In a clutch-control apparatus having a drum, means for rotating the drum, a belt connected to the clutch operating lever at one of the ends of the belt and to a control linkage at the other of the ends of the belt, said belt being wound around the drum and said control linkage and clutch operating lever being returned to their respective normal positions by means of springs, a compensator, said compensator having means constraining a part of the belt at the drum to return to a fixed position when the control linkage and the clutch operating lever are in their normal positions, and means for retarding the release of the belt when the control linkage is released from its deflected position.

16. In an automobile, the combination of an apparatus having means for operating the clutch controlled by a first floor-button, an apparatus having means for operating jointly the brakes and the clutch controlled by a second floor-button, an apparatus having means for accelerating the engine controlled by a third floor-button, and a floor-plate, said floor-plate being supported by the floor-board support or the steering-post, or by both, and supporting the first and second floor-buttons, said second floor-button being supported in close proximity to said third floor-button.

17. In an automobile, in combination, a brake control member, a clutch control member, an engine-power operable mechanism for operating said clutch control member, a sensitive control mechanism for controlling said engine-power operable mechanism, and an adjustable linkage operatively inter-connecting said brake control member and said sensitive control mechanism, whereby said clutch control member is operable separately by said sensitive control mechanism, and whereby said clutch control member is operable by said brake control member and in displacement related conjunction with said brake control member.

18. In an automobile, in combination, a brake control member, a clutch, an engine-power operable mechanism for operating said clutch, a sensitive control mechanism for controlling said engine-power operable mechanism, and means operatively connecting said sensitive control mechanism and said brake control member.

19. In an automobile, in combination, a clutch, an engine-power operable mechanism for operating said clutch, said mechanism having a clutch actuating member and a sensitive control device for controlling the clutch actuating member, and an inertia responsive compensator operatively connected with said senstive control device for continuously restraining the engagement of the clutch during the entire period of forward acceleration in proportion to said acceleration.

20. In an automobile, in combination, a clutch, an engine-power operable mechanism for operating said clutch, said mechanism having a clutch actuating member and a primary sensitive control mechanism for controlling said clutch actuating member, and an inertia responsive secondary control device having means for concurrently restraining the engagement of the clutch in proportion to the amount of forward acceleration of the automobile, during the entire period of forward acceleration.

21. In an automobile, in combination, a clutch, an engine-power operable mechanism for operating said clutch, said mechanism having a clutch actuating member and a primary sensitive control mechanism for controlling said clutch actuating member, and an inertia responsive secondary control mechanism operatively connected with said clutch actuating member and said primary sensitive control mechanism.

22. In an automobile, in combination, a brake control member, an engine-power operable mechanism for actuating said brake control member, said mechanism having a sensitive control device for controlling said brake control member, and an inertia responsive compensator operatively connected with said sensitive control device.

23. In an automobile, in combination, a brake control member, an engine-power operable mechanism for actuating said brake control member, said mechanism having a sensitive control mechanism for controlling the brake control member, and an inertia responsive compensator mechanism operatively connected with said brake control member and said sensitive control mechanism.

24. In an automobile, in combination, an engine, a clutch control member, an engine-power operable mechanism for operating said clutch control member, said mechanism having a sensitive control means for controlling the operation of said member, and an inertia responsive compensator for proportionally and concurrently restraining the release of said clutch control member in relation to the forward acceleration of the automobile.

25. In an automobile, in combination, an engine, a clutch, an engine-power operable mechanism for operating the clutch, a sensitive control mechanism for controlling the operation of the clutch, and an inertia responsive compensator controllable by said sensitive control mechanism, for continuously restraining the complete engagement of the clutch in concurrent proportion to the forward acceleration of the automobile initiated by partial engagement of the clutch, during the entire period of forward acceleration.

26. In an automobile, in combination, an engine, a brake, a brake-control member, an engine-power operable mechanism for operating said member, a sensitive control mechanism for controlling the operation of said member, and an inertia responsive compensator controlled by said sensitive control mechanism, for restraining the complete application of the brake in relation to the deceleration of the automobile caused by partial application of the brake.

27. In a motor vehicle, the combination with a clutch and an engine-power operable clutch actuator, of a compensator mechanism having an inertia responsive member displaceable in relation to the amount of forward acceleration of the vehicle established through the medium of said clutch, said member being operative upon displacement to concurrently restrain the engagement of the clutch in proportion to said acceleration.

28. In an automobile, in combination, a clutch, an engine-power operable clutch actuator, and a compensator mechanism having means for concurrently restraining the complete engagement of the clutch in proportion to the amount of forward acceleration of the automobile established by partial engagement of the clutch.

29. In a motor vehicle, a clutch, an engine-power operable clutch actuator and an inertia-motive control member having means for restraining the engagement of the clutch in proportion to the amount of forward acceleration of the vehicle, upon displacement of said member in response to said acceleration.

30. The combination, with a power-operated apparatus for actuating the clutch controlling member of a motor car, of mechanism responsive to a change in the relative rates of movement of translation of the car and of an element of said mechanism for modifying the operation of said apparatus.

31. The combination, with a power operated apparatus for actuating the clutch controlling member of a motor car, of mechanism operative responsively to a change in the relative rates of movement of the car and of an element of said mechanism to check the clutch closing movement of said member as soon as a sufficient degree of contact occurs between the clutch members to start or sharply accelerate the motion of the car.

EDWARD H. LANGE.